April 12, 1966     M. M. EARLE     3,245,539

FLUID SEPARATION SYSTEM

Filed Sept. 18, 1962     8 Sheets-Sheet 1

INVENTOR.

Murdock M. Earle

BY

*John Gibson Semmes*

ATTORNEY

INVENTOR.
Murdock M. Earle
BY
John Gibson Semmes
ATTORNEY

INVENTOR.
Murdock M. Earle
BY
John Gibson Semmes
ATTORNEY

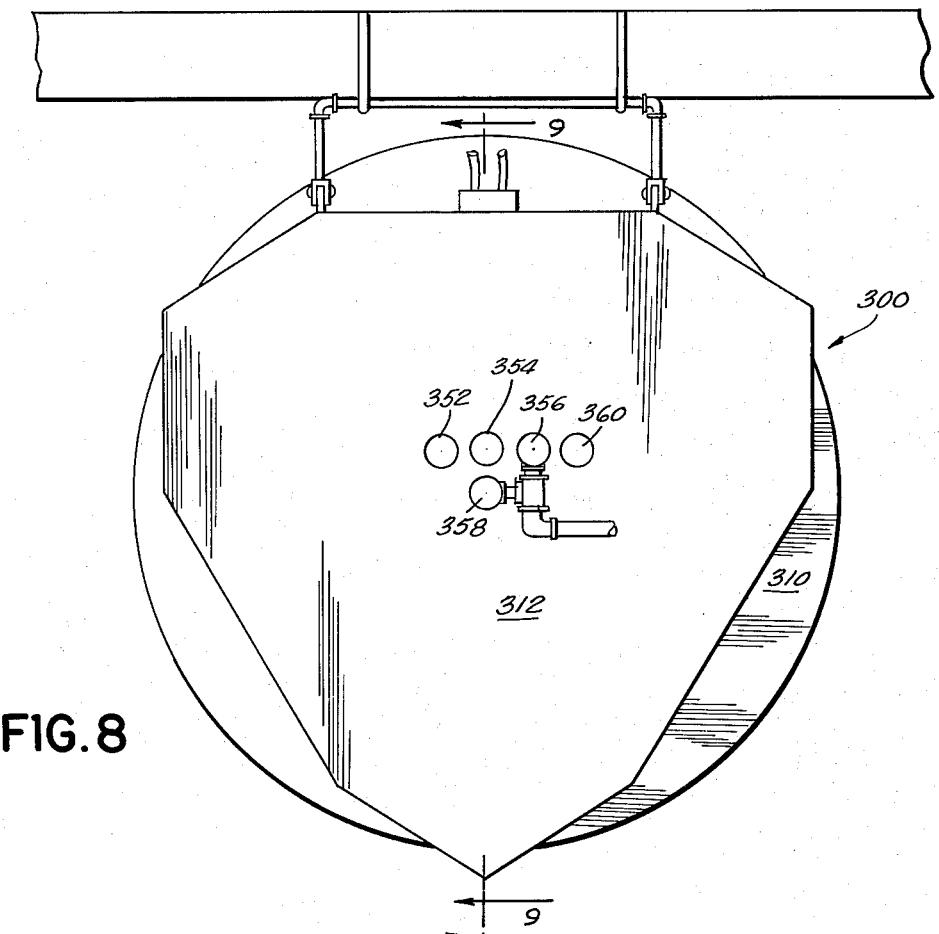
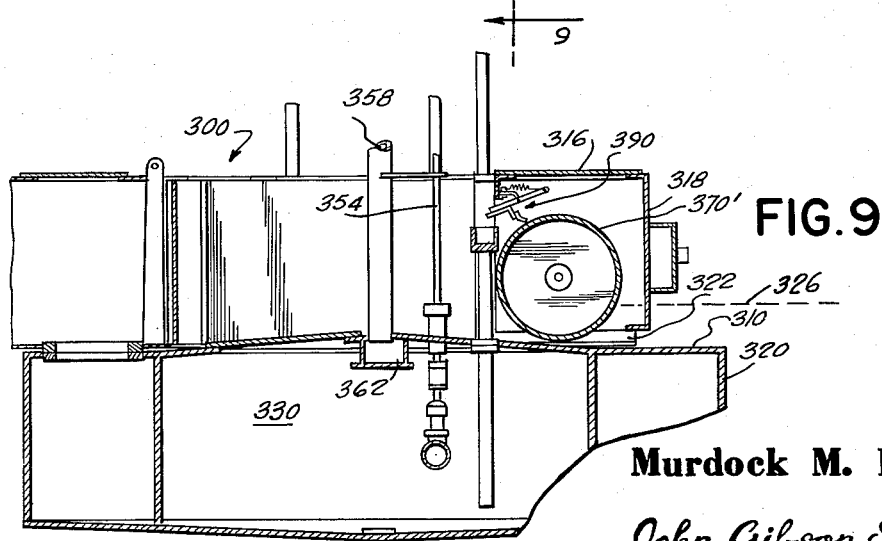

April 12, 1966

M. M. EARLE 3,245,539

FLUID SEPARATION SYSTEM

Filed Sept. 18, 1962

INVENTOR
Murdock M. Earle

BY *John Gibson Semmes*

ATTORNEY

April 12, 1966 M. M. EARLE 3,245,539
FLUID SEPARATION SYSTEM
Filed Sept. 18, 1962 8 Sheets-Sheet 6

INVENTOR
Murdock M. Earle
BY John Gibson Semmes
ATTORNEY

April 12, 1966 M. M. EARLE 3,245,539
FLUID SEPARATION SYSTEM
Filed Sept. 18, 1962 8 Sheets-Sheet 8

INVENTOR
Murdock M. Earle

BY *John Gibson Semmes*
ATTORNEY

United States Patent Office 3,245,539
Patented Apr. 12, 1966

3,245,539
FLUID SEPARATION SYSTEM
Murdock M. Earle, Catonsville, Md., assignor to Surface Separator Systems, Inc., Baltimore, Md., a corporation of Maryland
Filed Sept. 18, 1962, Ser. No. 224,470
11 Claims. (Cl. 210—242)

The present system relates to the separation of fluids of differing density and is more especially adapted to what is commonly known as oil film recovery.

This invention was conceived in the light of a growing need to overcome water pollution, brought about by the contamination of both potable and navigable waters through the deposit of oily substances exhausted by vessels, industrial plants, refineries, etc. The dangers inherent in such contamination include not only the menace to the safety and health of human beings, but also increased fire hazard and threats to waterfowl, animal and marine life.

Removal of oil films from water surfaces by known physical and chemical means has heretofore been unsatisfactory and costly. For instance, sinking the oil by the spreading of carbonized sand is but a temporary measure, and certainly an anti-pollution system of ineffective result. Emulsifying the oil, by the use of the present type chemicals, is an inefficient and futile practice. Present mechanical equipment for oil film removal requires such high power, and micrometric adjustment to avoid excessive water and air inclusion in the recovered liquid, that all such systems are unsatisfactory. The inefficient and laboratory nature of known oil recovery systems precludes economic use at commercial wharves, in gravity separators, aboard movable barges and other vessels in water courses, or in processing functions.

Accordingly, the present invention has been devised to take full advantage of the adhesion, cohesion, viscosity, wettability and surface tension characteristics of the various oils and their natural repulsion of water. The principle of operation is similar to that of the offset printing press wherein greasy portions of a cylinder may be utilized to repel water and attract ink. It is through the unique series arrangement of multiple collecting and pick-up surfaces, however, that one may concentrate, recover, separate and pump the contaminant oil film in one efficient, continuous, and combined operation. In this system, the components may be mounted for stationary recovery such as on a retention basin or for moving recovery such as from a barge or other floating craft. Here, there is contemplated at least one collecting and concentrating surface, such as a cylinder, a portion of which is immersed in the contaminated water having an oil film atop, whereupon by motion of the surface, in this case the rotation of the cylinder, the thin oil film is transferred to an enclosed area which confines a comparatively thick oil film therein. To facilitate the action of the collecting and concentrating surfaces, mechanical wiping means are generally applied thereby positively depositing the collected oil from the cylinder into the enclosed area. Moving at a synchronous speed is a recovery and separation surface which has been adapted to immersion in the enclosed area for collecting therefrom the thick oil film and depositing same by a wiping means into a trough, tank, or other collecting facility or storage container.

The system is primarily intended for the retrieval of persistent oils including fuel oils, lubricating oils, vegetable oils and the like. In its more refined modification, the non-persistent products such as gasoline and kerosene may also be recovered; it being obvious that the invention may be adapted to any separation of dissimilar or immiscible laminated liquids or discrete granular solids floating on a liquid.

In the drawings:

FIG. 8 is a top plan of a modification of oil recovery strum;

FIG. 9 is a vertical sectional view taken along the lines 9—9 of FIG. 8;

Figure 1:
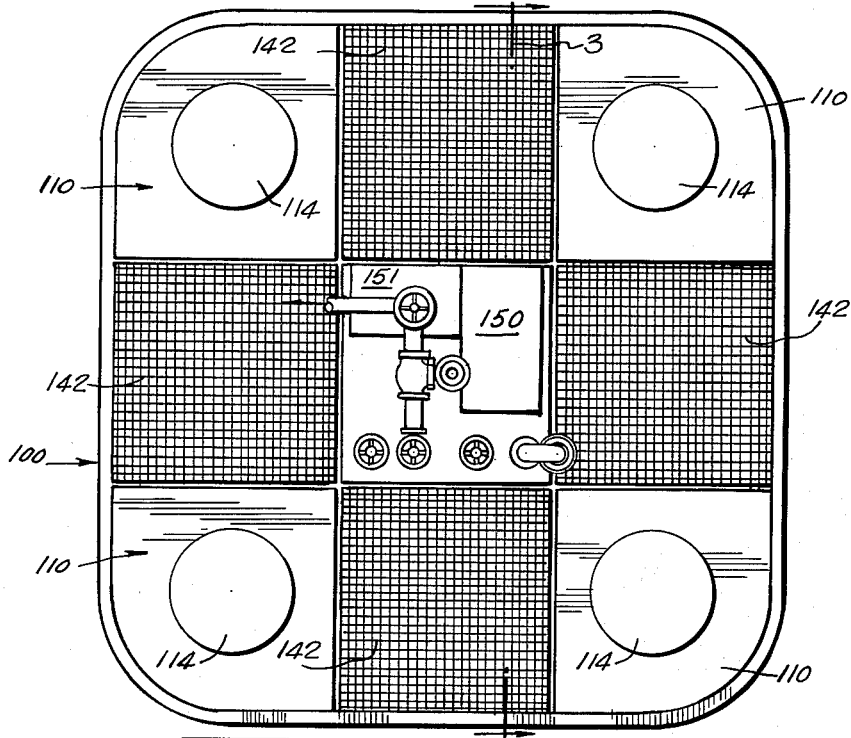
FIG. 1 is a top plan view of a self-contained buoyant terminal unit.

Referring now to FIGS. 1 through 4 inclusive, the self-contained terminal unit 100 is a vessel having buoyant compartments at its four corners and which floats during normal operation with the liquid level at 144. In this innovation, there are three sides 120 each apertured as at 140, providing a water sluice. Some form of grating is usually provided at apertures 140 to prevent flotsam from damaging any part of the mechanism. The side 120' (FIGS. 3 and 4) which is adjacent the pick-up drum is not apertured but closed to prevent loss of collected oil. The water tight corner sections 112 of the vessel extend from top to bottom and are designed to provide the necessary buoyancy and stability for the terminal unit. An hydraulic displacement storage tank 130 is provided between the tank top 124 and bottom 122, and is defined by the tank top 124 as the top, 122 as the bottom, 120 and 132 as the sides, all forming a cross-shaped tank. The sides 132 are carried through the tank 130 as webs 128 for proper stiffness.

A water discharge sluice 126 permits the flow of water out of the sump while preventing loss of the floating oil layer within the sump. The sluice is defined by wall 120' and the bent down end of the tank top 124, and sides 132.

The terminal unit 100 is provided with a working deck at the top thereof, the corners 110 of which are normally solid plate with watertight manholes 114 for access to corner sections 112, and that part over the collecting and recovery drums is usually an openwork grating 142 to permit inspection of operation.

Figure 2:
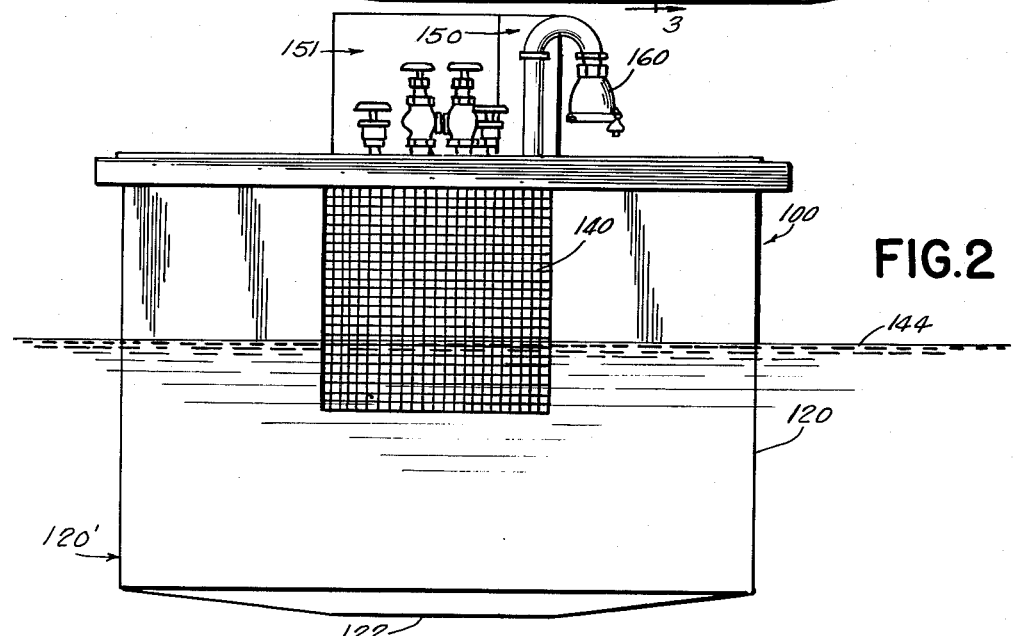
FIG. 2 is a view in side elevation of the embodiment of FIG. 1.
Figure 5:
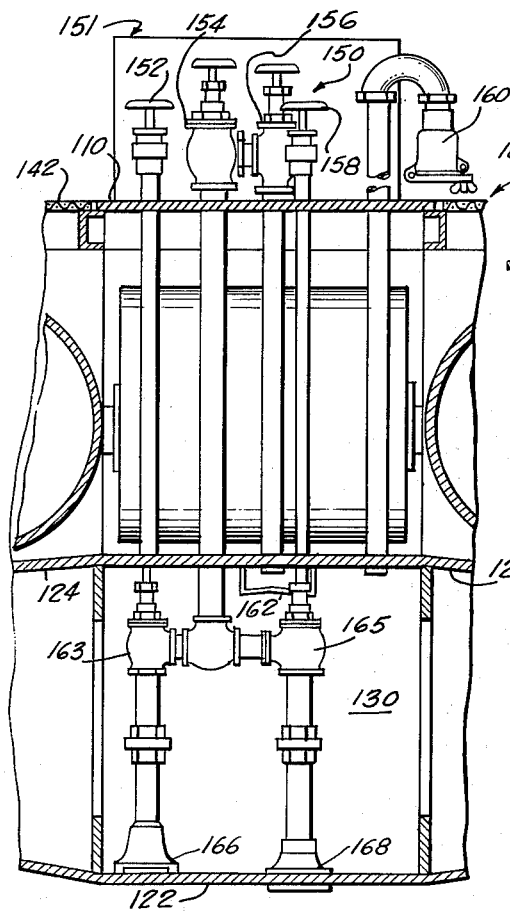
FIG. 5 is a vertical sectional view of the embodiment of FIGS. 1 and 2 taken along the lines 5—5 of FIG. 4, this being a vertical sectional view in fragment.

Referring to FIGS. 2 and 5, the hydraulic discharge system includes power unit 150 and discharge pump 151, low suction valve 163 with control wheel 152; shut-off valve 154; high suction valve 156; sea valve 165 and control wheel 158, and vent terminal 160, all with piping connections as shown. It will be obvious that the power unit 150 and/or pump 151 may be alternately remotely located and/or controlled. Beneath the high suction valve 156 there is a deflector plate 162, which is adapted to reduce a tendency in the system to take water through the oil while pumping. The numeral 168 represents a sea chest having connection with sea valve 165 and shut-off valve 154 as well as the adjacent inter-connected low suction valve 163. The numeral 166 represents an internal tank suction similarly connected to valves 158, 154 and 163.

Figure 7:
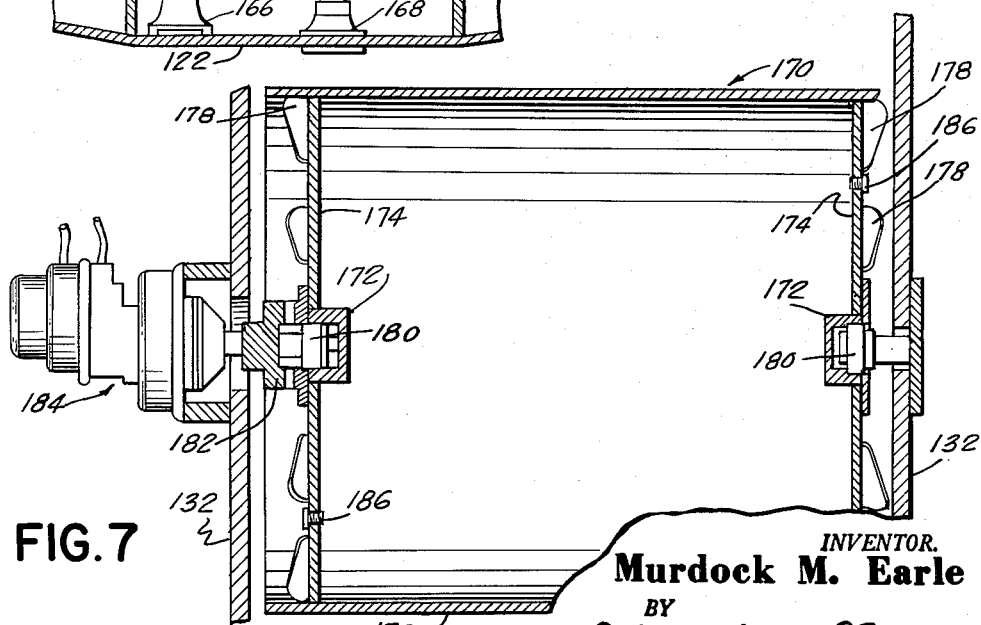
FIG. 7 is a vertical sectional view of the drum, taken along the lines 7—7 of FIG. 4.

The collector drum 170 is best shown by reference to FIG. 7 in which one will find a direct-drive drum assembly, including a centrally aligned pair of bearing housings 172 joined to the drum surface 176 by end walls 174. The surface 176 of the drum 170 has a sand blasted, ground or etched finish, preferably. The cylinder generating line should be longitudinally straight to assure wiper blade contact along its full length. The bearings 180 are preferably self-aligning and the drum is driven through a flexible coupling 182 by a motor 184.

In the drum construction, fins 178 may be provided peripherally within the confines of the drum to guide centrifugally displaced film to the sump for pick-up. These fins create a surface current to the oil-water interface, providing thereby collections of "islands" of oil which are attracted to the collecting cylinders by their rotary immersion action. Appropriate drain plugs 186 are conveniently located on the ends of the drum. Drums may also be expediently filled with some lightweight material such as foamed-inplace plastic which will prevent waterlogging should they not be absolutely watertight.

Figure 3:
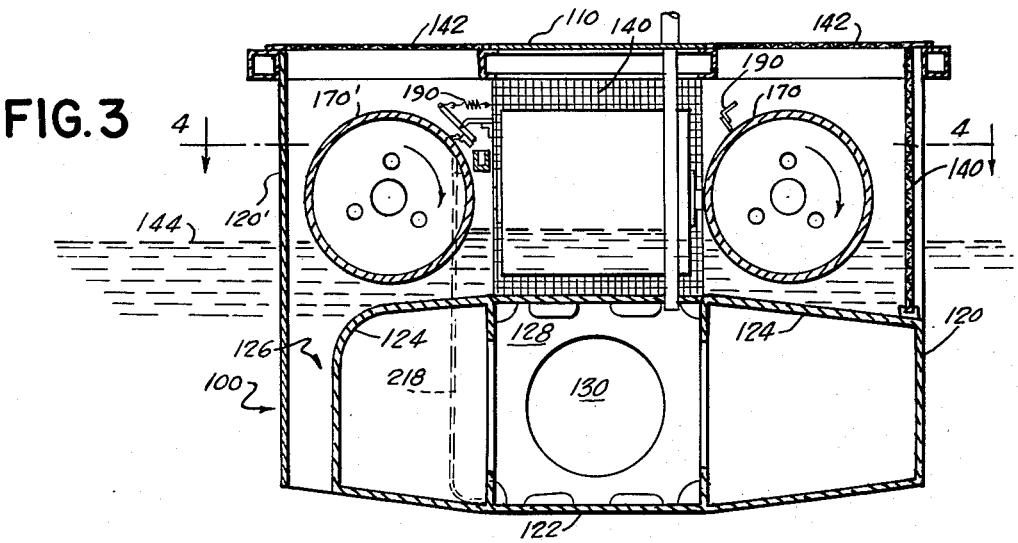
FIG. 3 is a view in vertical section taken along the lines 3—3 of FIG. 1 of the embodiment thereof.
Figure 4:
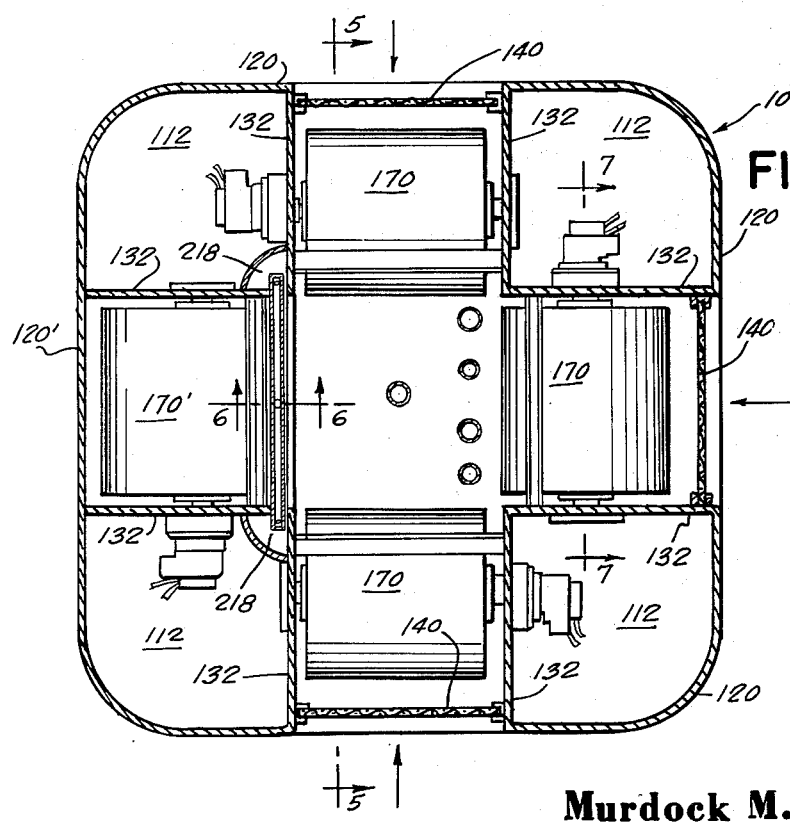
FIG. 4 is a view in horizontal cross-section taken along the lines 4—4 of FIG. 3, showing the embodiment thereof; and in particular the arrangement of the respective collecting and pick-up components.
Figure 6:
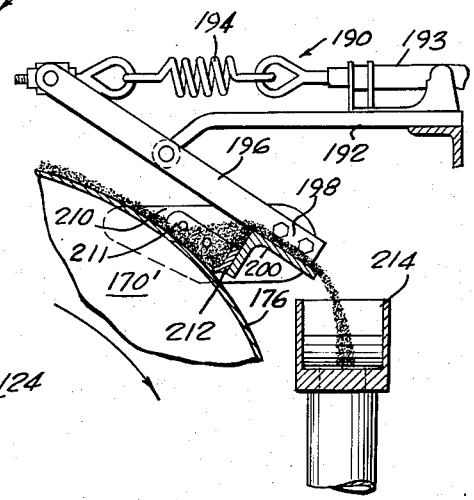
FIG. 6 is a view of a preferred form of wiper blade assembly, showing its relaltionship to the pick-up components of FIG. 4 and to the means for transferring the recovered product.
Figure 12:
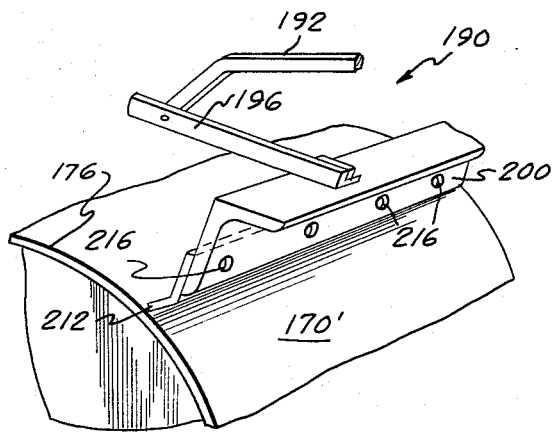
FIG. 12 shows a modification of the removal system exemplified in FIG. 6.

Now, referring to FIGS. 6 and 12, the wiper blade assembly 190 includes as its basic component, support arm 192 which is fixed by a suitable bracket to an interior structural member such as shown in FIG. 3. Engaging the support arm and linking it to a lever arm is a toggle clamp 193 and extension spring 194. The lever arm 196 is pivoted generally centrally thereof and at its lower end 198 carries the wiper which includes a bearing bar 200 and wiper blade 212. The bar 200 supports end closures 210, each of which is adapted to slide contiguous to the ends of the recovery drum 170'. The wiper blade 212 is preferably fabricated of a neoprene or other durable resilient material having at its end a sealing extension 211 which is attached to the end plate 210.

Now, with reference to the modification in FIG. 12, it will be noted that the wiper assembly 200 is provided with "weep" holes 216 wherein, during recovery by pickup of the oil, from the surface of the drum any "contained" or entrained or adhering water may be bled off through the "weep" holes and the recovered oil spilled over the top of the wiper assembly 200 into the trough 214. Obviously, the "weep" holes may be valved thus permitting alternate use or disuse.

The trough 214 is preferably V-shaped end to end, so that its bottom slopes down from the longitudinal center of the drum to each end, the oil passing through an opening in each of the adjacent compartments of the trough into the spill flumes 218 (FIG. 3).

As indicated in the operational characteristics of the system of FIGS. 1 through 5 inclusive, the storage tank 130 is always filled, ensuring reasonably constant immersion of the collector and pick-up cylinders. A small variation in extent of immersion occurs due to the variation in specific gravities of oil to water, but this is of no practical consequence. Ballast may be admitted or removed from compartments 112 (FIG. 4) for initial or periodic adjustment of the self-contained unit 100. A suitable discharge pump 151 and piping is carried either atop of or remote to the unit shown in FIG. 1. Here fluid transfer is effected by appropriate manipulation of the valve controls shown in FIG. 5. Likewise, cleaning the pipe line may be accomplished. Normally, the vent line 160 remains open to prevent the build-up of either pressure or vacuum in the storage tank from thermal expansion, inadvertent or deliberate misoperation of the valves, pipe stoppage, etc. These pressure and vacuum conditions, should they arise, are also compensated for by action of the normally open condition of the spill flumes 218, as shown in FIG. 3. These flumes may, in turn, also be valved.

In practice, it has been found preferable, though not always necessary to have a wiper blade 190 in contact with the collector drum (FIG. 3). If wipers are not used, these lead drums reach a point of saturation, so to speak, and efficiency, though decreased, remains satisfactory, the excess oil which has been collected flowing into the sump as the collector drum rotates.

Concerning operation of the wiper blades, although fixed blades 212 are shown, it will be appreciated that a roller which is placed into contact with the collector or pick-up drum may serve substantially the same purpose. Additionally, neither fixed nor rotary wiper need bear directly on the surface of the cylinder for, depending upon the thickness of the film adhering to the collector or pick-up drums, the wiper may be held at a distance from the cylinder which is a fraction of the oil film thickness. In this manner one may remove a major portion of the oil from the cylinder leaving, however, a thin layer of oil thereon. This in effect, leaves the cylinder constantly coated, rendering a cohesive oil-attractive surface to the oil film in the sump. Adjustment of the wipers can be made such as to take advantage of either the cohesion or adhesion of recovered liquid, whichever may be the greater.

In operation of the basic system 100, the storage tank 130 is filled with water at the beginning. The respective collecting drums 170 are each rotated downwardly towards the water, so that the oil film such as has been deposited upon the natural water (base liquid) is collected by the drum and deposited into the enclosed interior or central portion of the terminal unit which might be defined as the "sump" thereof. This is the area in which, by the combined action of the respective collector drums, a thick oil film in the sump is developed and maintained; the respective collector drums each usually having wipers or scrapers 190 affixed in flexible, riding contact at their rear as shown in FIG. 3. Meanwhile, the pick up drum 170' is synchronized to rotate at a suitable speed to efficiently and effectively recover the oil which is wiped off into the trough formed by the wiper 190 and the surface 176 of the drum, whereupon overflow passes to trough or tank or flume. Now, as the oil builds up on top of the water which is already in the spill flumes, it will create an hydrostatic head on the water, permitting the oil then to enter the storage tank through openings at the bottom of the flumes which, incidentally, are also generally located at the bottom of the tank 130. The oil then will separate out and rise to the top of the storage tank. To displace the water, the oil entering the tank rising to the top, forces water into the suction-discharge 166 located at the bottom of the tank 130 passing through the inter-connected conduit, the low suction valve 163, the sea valve 165, and out to the sea via sea chest 168. When the tank is filled with recovered oil, the interconnected discharge pump 151 is started, at which time the high suction valve 156 is opened and the vent cover at 160 is closed. Oil may then be pumped out through the high suction valve conduit and discharged to a tank or other facility such as a storage tank or barge. Now, as oil is pumped out, water re-enters the tank through the sea chest 168, passing respectively through the U-shaped valve system comprising the elements 165, 163, and 166 and associated piping, and thence into the bottom of the tank. Closing the cover on the vent terminal 160 prevents drawing air into the tank to render the pump inoperative. This is, accordingly, why the spill flume opening is generally located near or at the bottom, rather than near or at the top, of the tank. It is preferable that the storage tank remain full either of water, oil or combination thereof, to ensure that the water line or draught of the terminal unit is reasonably constant, whereby immersion of respective collector and pick-up cylinders also remains essentially constant.

It is also obvious that the picked up oil may be pumped or spilled directly from the trough to storage thereby eliminating the tank 130 altogether.

Figure 10:
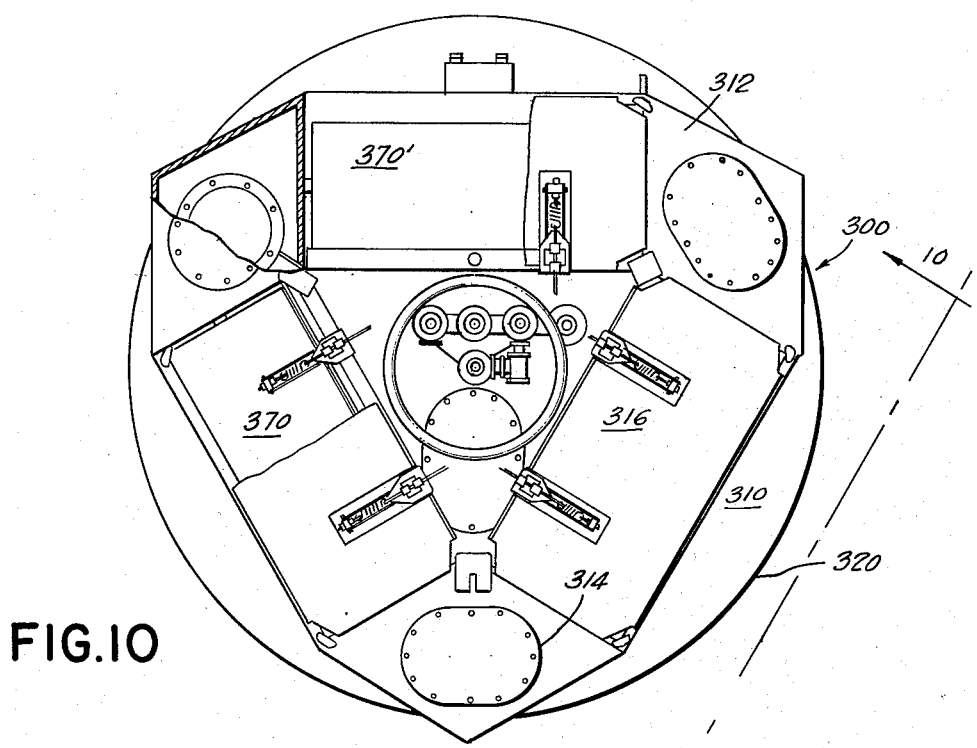
FIG. 10 is a plan view of the FIG. 8 invention, portions of the deck plate being removed to expose the compartment for the respective collecting and pick-up components.

The embodiment of FIGS. 8, 9 and 10 and 11 is designated as an oil recovery "Strum." The system 300 is designed for semi-permanent attachment to the baffle of a dock, dam, or the like, and includes a tank top 310 having superdeck 312. Deck 310 comprises the top of the storage tank and 312 has manhole access covers 314 and drum access cover plate 316, as shown in FIG. 10. In this system, the pick-up drum 370' comprises the base of the triangle formed by the respective collector drums 370 as well as pick up drum 370'.

Figure 11:
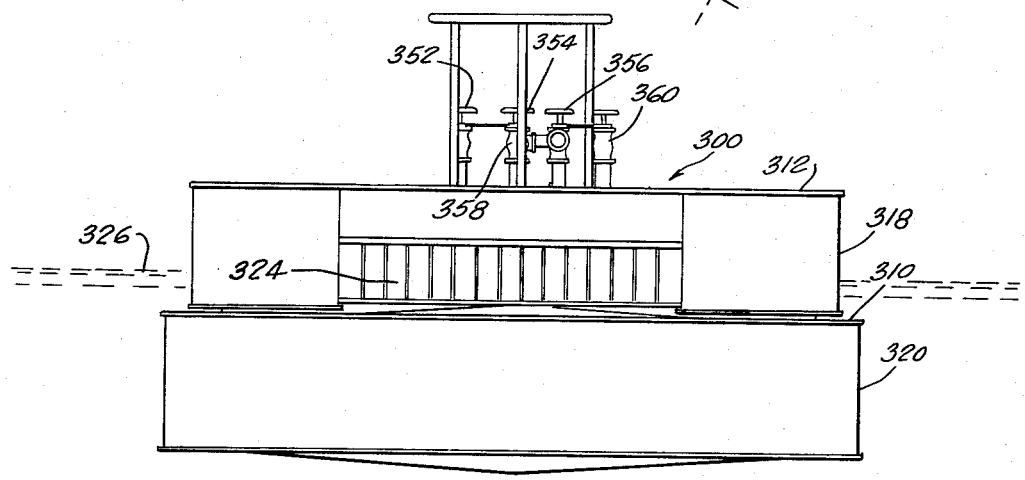
FIG. 11 is a side view taken along the lines 10—10 of FIG. 10.

The device in FIG. 8, it is noted, consists of oil recovery apparatus at the top and buoyancy and storage compartment at the bottom. The upper unit may be used independently with a remote tank and may be self-buoyant or otherwise supported. The vertical sectional drawing of FIG. 9 shows the relationship of the pick-up drum to the remaining structure and controls, including the high suction line 358 and the sea valve control 354. The pick-up drum 370', wiper system 390 and its related trough are shown in FIG. 9. A gap 322, with or without removable cover, is left in the closed side 318 rearwardly of the pick-up drum 370' so that the sponson which houses the drum may be periodically flushed out to the sea to release any collected debris. The strum unit is self buoyant and floats during normal operation with the liquid level at 326. Intake sluiceways 324 for the respective collector drums 370 are best shown in FIG. 11.

Elements 320, 330, 352, 356, 360 and 362 and 390 correspond to the similarly numbered elements on the configuration of FIGURES 1 through 4.

The advantages derived from the use of this system 300 include the following. Not only are there constructional advantages of combining the respective collecting and pick-up components in operative relation to a storage system; but also, by reason of the triangular relationship, one is permitted to employ the largest possible drum area for the smallest possible supporting unit. This particular system which employs plural drums in triangular relationship is best adapted to the collection, pick-up and temporary storage of oils of higher concentrations. The thinner film hydrocarbons are better suited to the modification of FIGS. 1 and 2 wherein there is a higher proportion as between the collector and pick-up components. In this system 300, however, by reason of the divergent location of the collector drums, a steady flow of the collected oils in the sump which is located in the center of the system is fed to the pick-up, supplementing the natural attractive influence of the pick-up per se. Additionally, in view of the fact that the maximum divergence of respective collector drums is immediately adjacent to the end of the pick-up drum, one is assured a substantially uniform flow of the sump oils to the pick-up drum along its longitudinal surface.

It will be apparent from the foregoing that both the collector and pick-up cylinders of any recovery unit may be used to recover oil directly from the surface of the water when the surrounding oil film is initially thick. In such a system, the collector cylinders are provided with recovery wipers and troughs adjacent their fronts and sump wipers behind. When the surrounding oil film becomes thin, the recovery wipers on the collectors (leading drums) are released and the regular (sump) wipers reengaged. It is also self-evident that a movable wiper system may be employed to suit both purposes.

Figure 15:
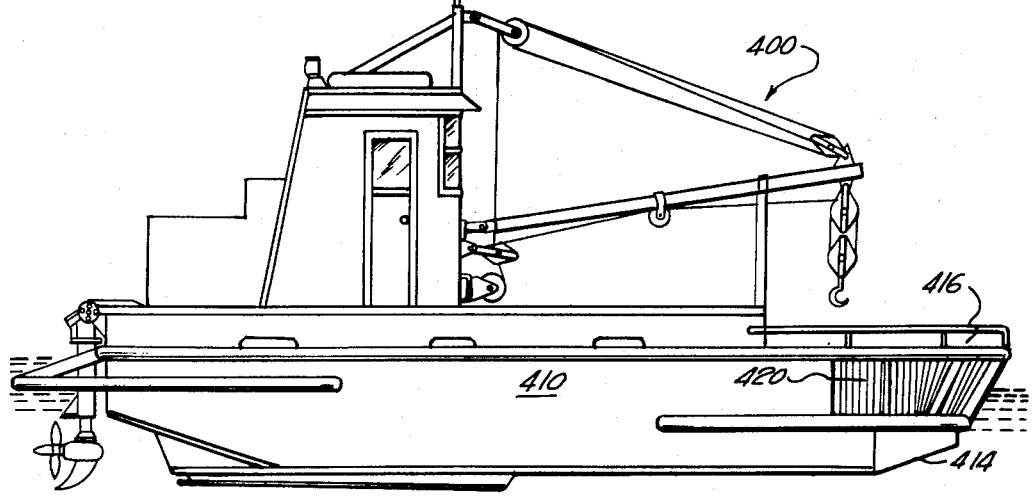
FIG. 15 is a view in side elevation of a barge, including the concept of invention which is best illustrated in FIGS. 1–4 inclusive.
Figure 16:
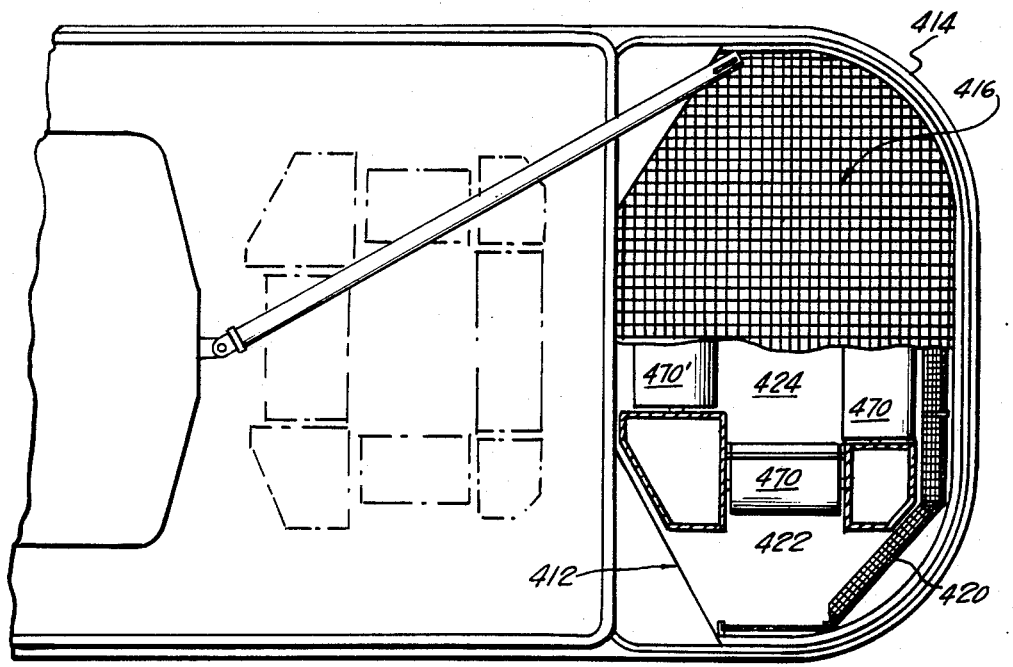
FIG. 16 is a view in plan fragment of a portion of the barge of FIG. 15 indicating the relative positioning of collecting and pick-up means.

Adopting the same system of adherence of oils to be recovered to the recovering surface, coupled with coherence of the separated fluid, a movable vessel, which is principally designed for recovery of the heavier oils has been conceived. This is illustrated in FIGS. 15 and 16. In this, the combination comprises plural collecting drums which are three in number. Each is disposed to form three sides of a rectangle, the fourth of which includes the pick-up drum. The barge 400 has a hull 410, closed at 412 to form a recessed bow 414 having an open superstructure 416 and intake ports 420, giving a confining area 422, and sump 424 between the collecting drums 470. These drums 470 are three in number and are employed in combination with the pick-up drum 470'.

This self-propelled oil recovery barge shows the principal operative components to be substantially the same as those depicted in FIGS. 1 through 7 inclusive. As in the preceding constructions, the recovery or pick-up drum may be operated intermittently or at a synchronous speed. Additionally, it is preferable that means be provided for the vertical adjustment of each of the drums so that they may be raised or lowered independently of each other. Additional drum immersion adjustment may be accomplished by differential ballasting of the barge itself. It will be apparent that should the pick-up drum in either of the modifications be immersed within a bath of the fluid which is being recovered and yet not penetrate the interface between the buoyant and supported media, the efficiency thereof would be increased. Accordingly, this modification involving adjustment of the pick-up drum is especially useful in the recovery of the less viscous or light oils. Of course, the rate of pick-up of the oil film depends upon the type of oil to be recovered, its surface tension, its viscosity, cohesion characteristics, adhesion characteristics, wettability, density, film thickness, specific gravity and temperature. Where highly viscous liquids and certain solid tars are to be recovered, heat may be applied through coils, jets or other elements installed within the sump or around or inside the cylinders to reduce the viscosity and, hence, improve the rate of recovery and reduce flow and pumping problems. Here again, both the surface treatment and the speed of either collecting or pick-up cylinders is determined by the characteristic of the film and/or the base liquid to be recovered. These and other factors may either be calculated or determined empirically. In the barge construction, it is found that the drums may be made of rolled metal since it is planned to principally use the barge for the recovery of heavier oils. Machined or polished surfaces of the respective drums are generally reserved for the recovery of the lighter oils such as gasoline and the like.

Figure 18:
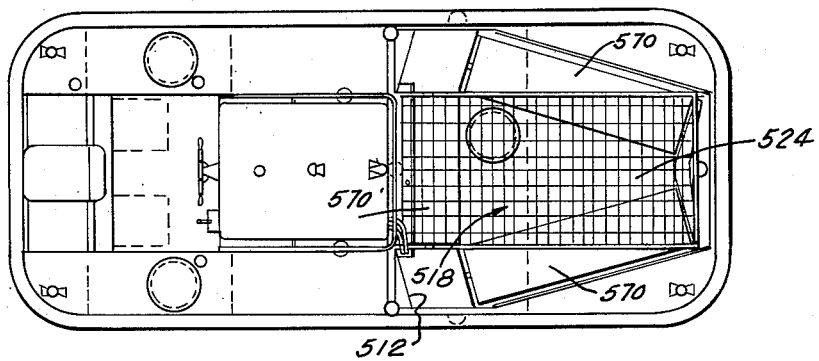
FIG. 18 is a top plan view in fragment, showing collecting and recovery components in the forward part of the craft.
Figure 17:
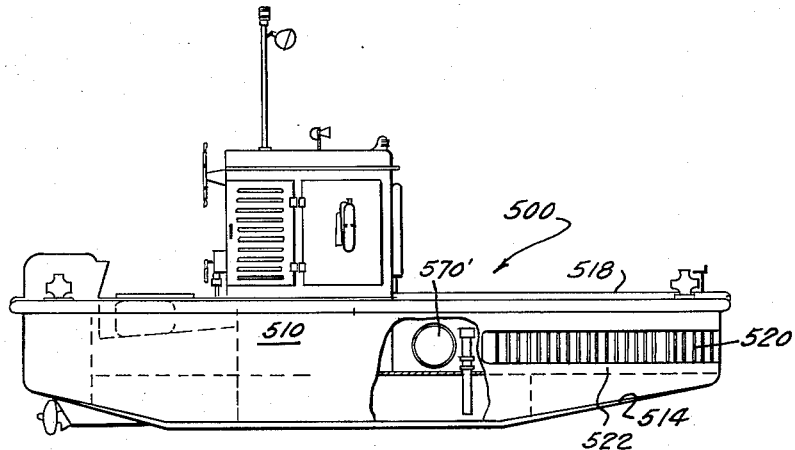
FIG. 17 is a view in side elevation of a marine terminal skimmer craft otherwise identified as a modification of the basic concept, closely related to the FIG. 15 modification.

A further modification of invention, closely related to the 400 series modification described, is depicted in FIGS. 17 and 18. This unit 500 is known as a Marine Terminal Skimmer. It has a hull 510 closed at 512 to form a recessed bow 514, having an open superstructure with an open grating deck 518, with intake ports 520 below on the sides. The ports 520 are usually protected by a removable screen. As in the 400 modification, the superstructure and collector drums define a sump 524 wherein the film is collected and deposited. Collecting drums are designated 570 and the pick up drum 570'. The operational basis of this barge is like that of the series 300 FIGS. 8 and 9 modification.

Figure 13:
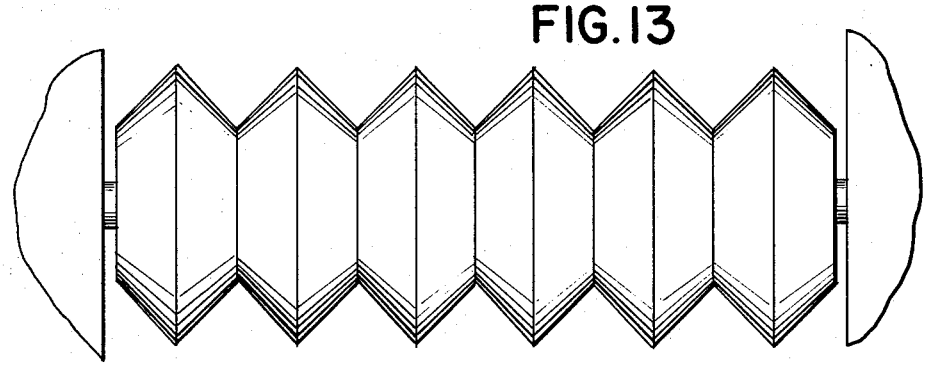
FIG. 13 shows a modification of the collecting and pick-up components.
Figure 14:
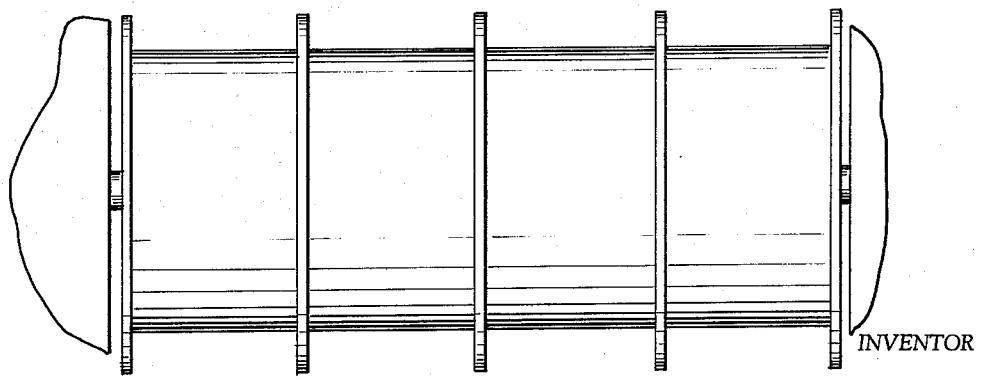
FIG. 14 shows still a further modification of collecting and pick-up components.

It is proposed by way of choice that the collector drums such as shown in either of the drawings may be substituted by one or the other of the configurations shown in FIGS. 13 and 14. Where a collector drum is employed with fins of the type shown in FIG. 14, the oil film is attracted to the fins more readily than to the drums per se, leaving a partial void on the collector drum in the center, longitudinally between the respective discs. This system is, however, particularly efficient under extremely limited space requirements, the more simple plain cylinder being employed where space is no problem. In both of the FIG. 13 and FIG. 14 modifications a more complex wiping system will be required whether it be static or rotary contact.

The modification of FIG. 13 is such as to take advantage of the flow characteristics previously mentioned, exposing to the supported film a complete surface of revolution having virtually no void. Thus corrugations or serrations are provided. FIG. 13 may be modified through rounding and/or truncating the serrations, or both.

From the foregoing it will be observed by those skilled in the art that various modifications to the system may be made without departing from the scope of the invention as defined in the appended claims. For instance, belts or reciprocating surfaces may be substituted for drums, variant wiping means may be employed in connection with collecting and concentrating elements on the one hand, and recovery or pick up components on the other hand. Multiples of collecting and pick up elements in series, parallel, or series-parallel relationship will obviously enhance the operation without departing from the spirit of invention, as set forth in these annexed claims.

I claim:

1. A system for the separation and recovery of either surface or sub-surface fluids of different densities which comprises:
    (A) a plurality of collecting components, each of said collecting components having a solid continuous surface, and being partially immersed in the fluids;
    (B) a recovery component, said recovery component having a solid continuous surface;
    (C) supporting means to support said collecting components and said recovery component in spaced relationship to each other to define a sump comprising a first storage area;
    (D) rotating means to rotate said collecting components, whereby they are coated with the fluid desired to be separated and recovered;
    (E) first fluid removing means actively engaging said collecting components to remove therefrom the separated fluid and deliver it to said sump;
    (F) said rotating means further being connected to rotate said recovery component; said recovery component being partially immersed in the fluid in the sump, whereby said recovery component is coated with fluid desired to be separated;
    (G) second fluid removing means operatively engaging the recovery component to remove therefrom the fluid desired to be separated;
    (H) trough means mounted to said system;
    (I) a second storage area; and means to convey the fluid from said second fluid removing means through said trough, to said second storage area.

2. The system as described in claim 1 wherein there are three collecting components, said three collecting components and said recovery component being arranged in the form of a closed rectangle, the sump being defined by said rectangle.

3. The system as described in claim 1 wherein there are two collecting components, the collecting components and the recovery component being arranged to form a triangular sump.

4. The system as described in claim 1 wherein the system is mounted on a self-propelled barge.

5. The system according to claim 1 in which at least one of the collecting and recovery components includes at least one peripheral fin extending from the surface of the component.

6. The system according to claim 1 in which at least one of the respective collecting and recovery components includes plural spaced fins, extending peripherally from the surfaces of the component.

7. The system according to claim 1 wherein at least one of the respective collecting and recovery components includes corrugated immersion surfaces.

8. The system according to claim 7 in which the corrugated surfaces are truncated.

9. The system according to claim 1 wherein at least one of the collecting and recovery components includes serrated surfaces of immersion.

10. The system according to claim 9 in which the serrated surfaces are truncated.

11. The system of claim 1 wherein power means are connected to said collecting and recovery components to rotate them, and wherein the rotating speed for the collecting components is higher than the rotating speed for the recovery component.

References Cited by the Examiner

UNITED STATES PATENTS

| | | | |
|---|---|---|---|
| 1,094,378 | 4/1914 | Schaanning | 210—253 |
| 1,530,078 | 3/1925 | Haynes | 210—242 |
| 1,573,085 | 2/1926 | Meiani | 210—242 |
| 1,599,163 | 9/1926 | Buchanan | 210—83 |
| 1,611,850 | 12/1926 | Fear | 210—242 |
| 1,860,819 | 5/1932 | Schamberger | 210—523 |
| 2,146,542 | 2/1939 | Hawley | 210—242 X |
| 2,470,418 | 5/1949 | Verner | 210—523 |
| 2,816,659 | 12/1957 | Van Deemter | 210—85 |
| 2,876,903 | 3/1959 | Lee | 210—242 |

REUBEN FRIEDMAN, *Primary Examiner.*

ROBERT F. BURNETT, *Examiner.*

J. L. DECESARE, K. V. ROCKEY, *Assistant Examiners.*